US008667552B2

(12) United States Patent
Subramanian et al.

(10) Patent No.: US 8,667,552 B2
(45) Date of Patent: Mar. 4, 2014

(54) STREAM CONDITIONING FOR SEAMLESS SWITCHING OF ADDRESSABLE CONTENT ACROSS TRANSPORT MULTIPLEX, USING LOCAL STORED CONTENT AS PRE-ROLL AND POST-ROLL BUFFERS; IN DIGITAL TELEVISION RECEIVERS

(75) Inventors: Baskar Subramanian, Bangalore (IN); Srinivasan Karapattu, Bangalore (IN); Srividhya Srinivasan, Bangalore (IN)

(73) Assignee: M/S, Amagi Technologies Private Limited, Bangalore (IN)

( * ) Notice: Subject to any disclaimer, the term of this patent is extended or adjusted under 35 U.S.C. 154(b) by 888 days.

(21) Appl. No.: 12/629,611

(22) Filed: Dec. 2, 2009

(65) Prior Publication Data

US 2010/0138889 A1    Jun. 3, 2010

(30) Foreign Application Priority Data

Dec. 3, 2008  (IN) ............................ 3045/CHE/2008

(51) Int. Cl.
*H04N 7/173*         (2011.01)
(52) U.S. Cl.
USPC .............................. 725/131; 725/32; 725/118
(58) Field of Classification Search
USPC ...................................... 725/32–36, 118, 131
See application file for complete search history.

(56) References Cited

U.S. PATENT DOCUMENTS

2009/0106104 A1*   4/2009  Upendran et al. .............. 705/14
2009/0237451 A1    9/2009  Park et al.
2009/0249382 A1*  10/2009  Weinblatt .......................... 725/12
2011/0171941 A1*   7/2011  Cusick et al. ............... 455/414.1
2012/0323651 A1*  12/2012  Fernandez ..................... 705/14.4

FOREIGN PATENT DOCUMENTS

JP        11-263018       9/1999
KR    10-2009-0100533    9/2009

OTHER PUBLICATIONS

Korean Office Action mailed Feb. 1, 2012 issued in corresponding Korean Patent Application No. 10-2010-0047629.

* cited by examiner

*Primary Examiner* — Nnenna Ekpo
(74) *Attorney, Agent, or Firm* — Laurence P. Colton; Smith Risley Tempel Santos LLC

(57) ABSTRACT

A system, method and apparatus to enable a form of addressable advertising content delivery in which multiple addressable content streams are sent in a transport multiplex, Addressable Content Channel Multiplex, different from the Primary Channel Multiplex on which the Primary Channel is delivered describe the present invention. The Primary Channel is network stream onto which the addressable content is to be inserted. Seamless switch between the Primary Channel and the addressable content streams on the Addressable Content Channel Multiplex is accomplished by using Receiver stored content as interim buffers to which the switching happens prior to switching to a different transport multiplex. These buffers in effect feed the audio and video decoders with content, during the time it takes for the tuner to switch to a different transport multiplex. Two content buffers, Pre-roll and Post-roll are used during switching, one from Primary Channel Multiplex to Addressable Content Channel Multiplex and another when switching from the Addressable Content Channel Multiplex to the Primary Channel Multiplex.

21 Claims, 9 Drawing Sheets

Splice'nSwitch concept diagram

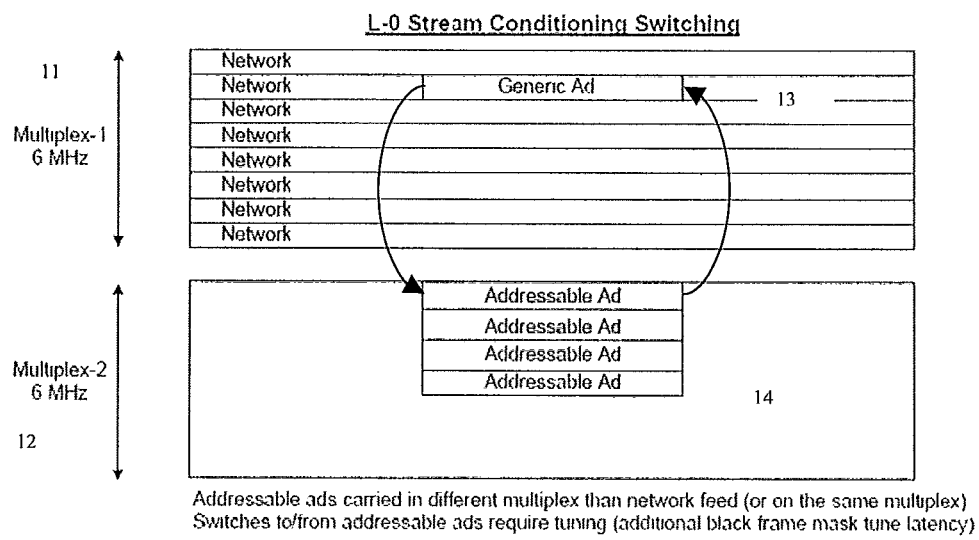
Fig 1. Level-0 stream conditioning switching

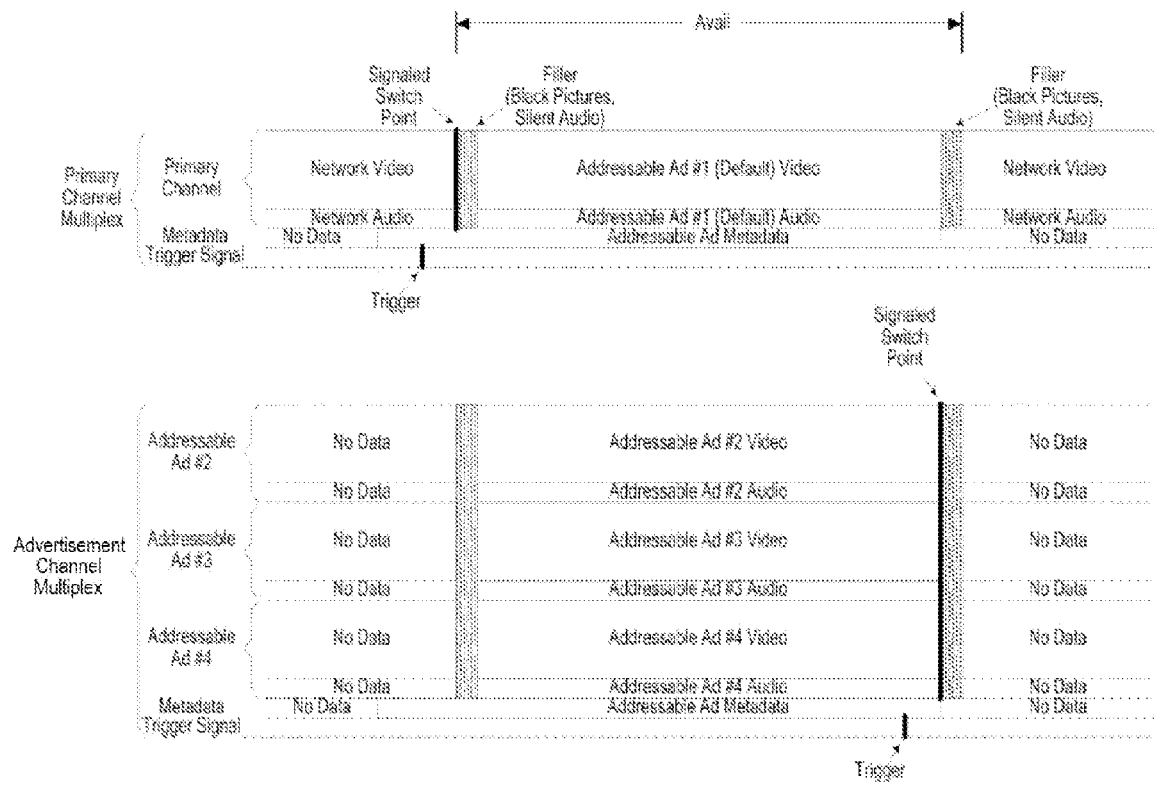
Fig 2. Filler (black frames) on a Level-0 transport multiplex
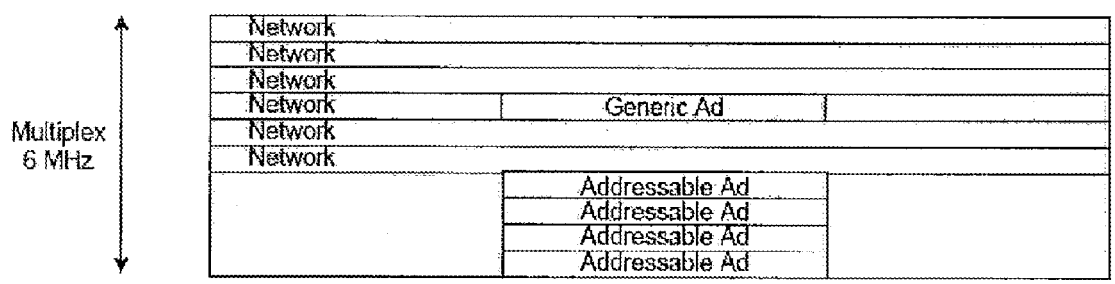
Fig 3. Level-1 stream conditioning switching

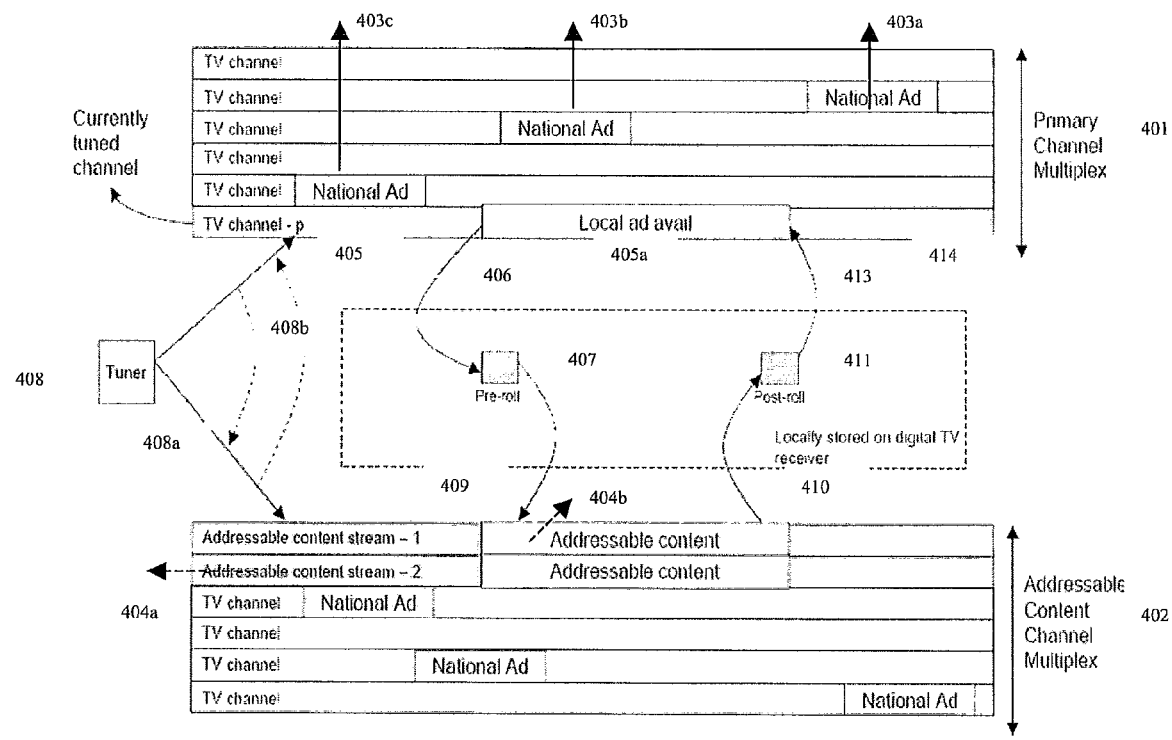
Fig 4. Splice'nSwitch concept diagram

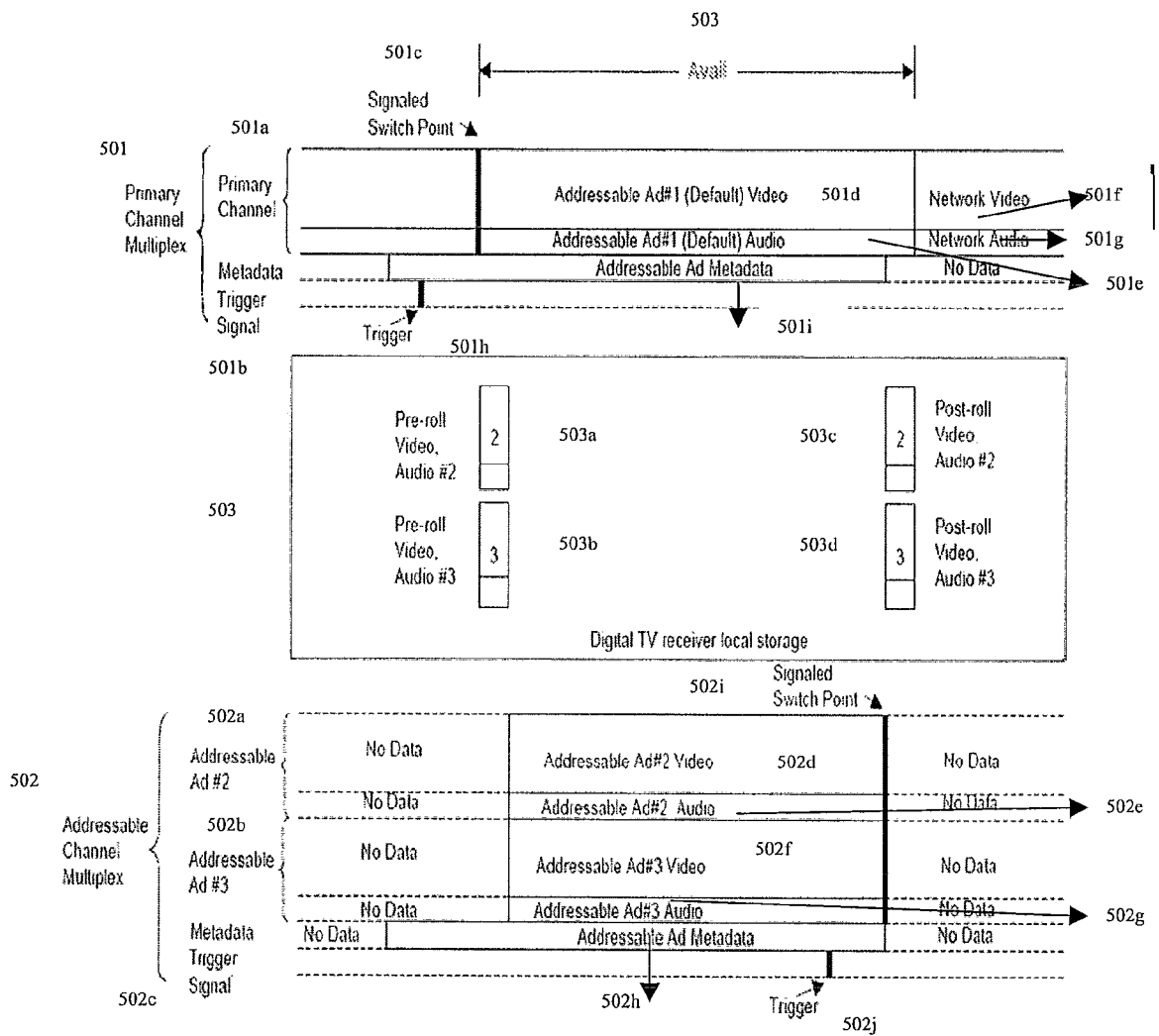
Fig 5. Splice'nSwitch Pre-roll, Post-roll content and transport multiplex

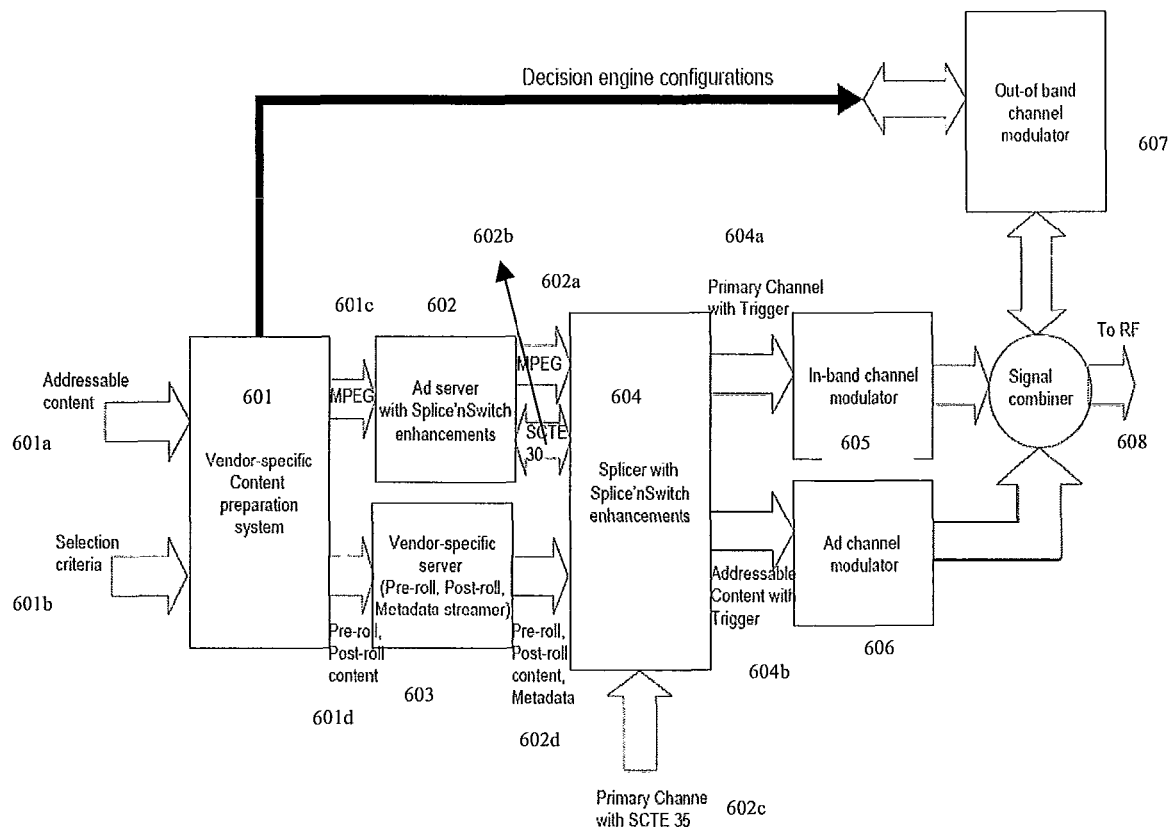
Fig 6. Splice'nSwitch headend architecture

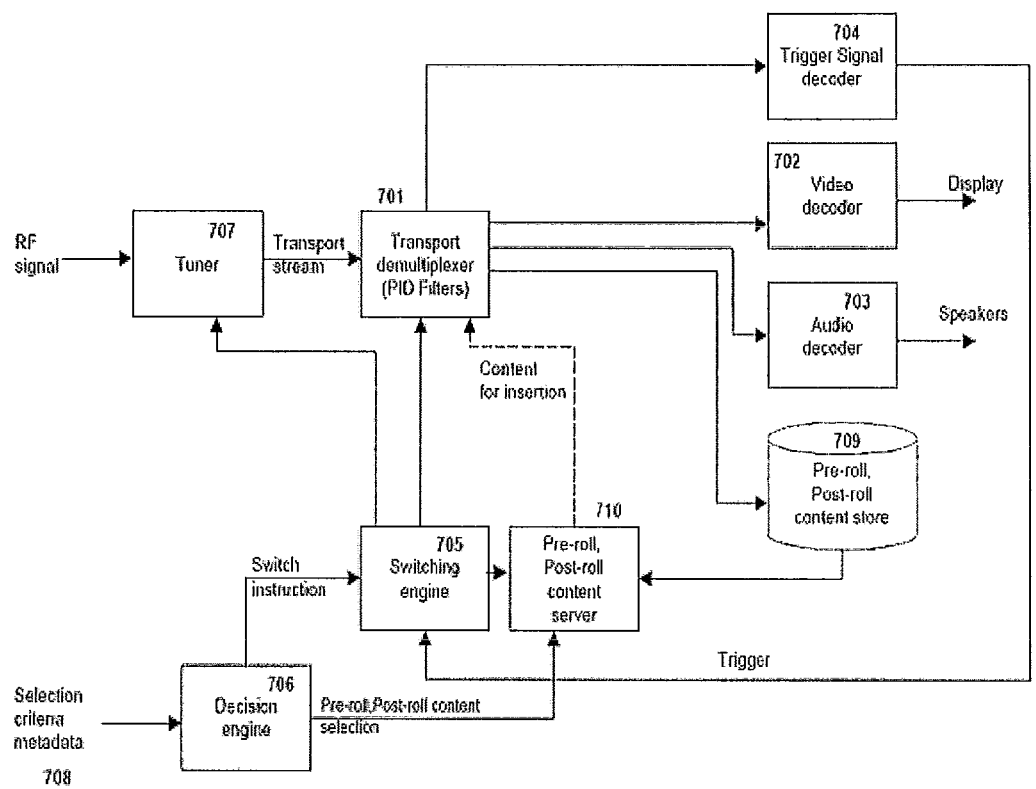
Fig 7. Splice'nSwitch Receiver architecture

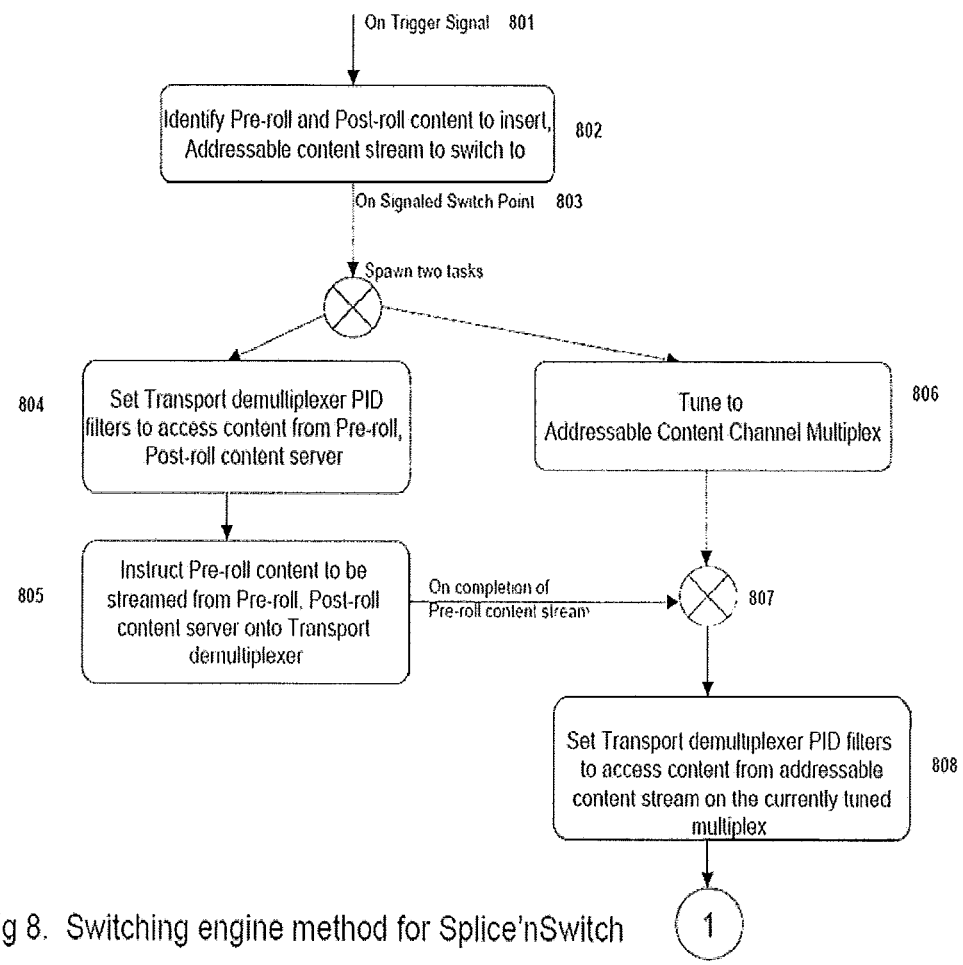
Fig 8. Switching engine method for Splice'nSwitch

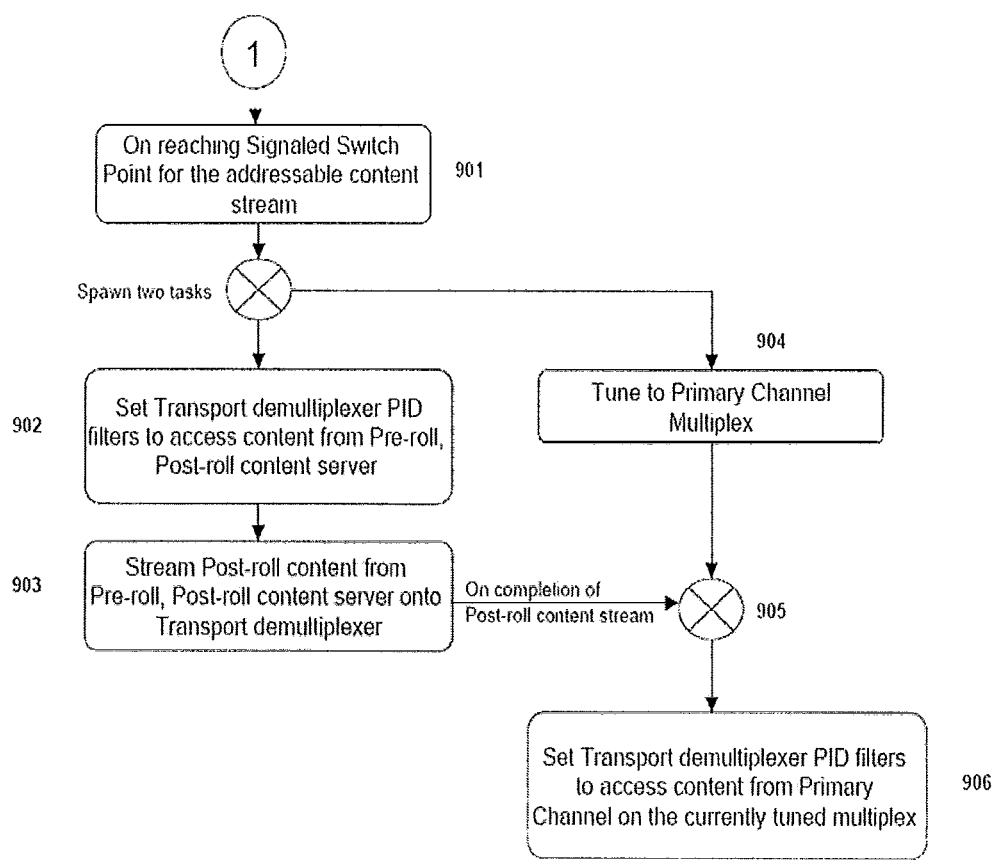
Fig 9. Switching engine method for Splice'nSwitch

STREAM CONDITIONING FOR SEAMLESS SWITCHING OF ADDRESSABLE CONTENT ACROSS TRANSPORT MULTIPLEX, USING LOCAL STORED CONTENT AS PRE-ROLL AND POST-ROLL BUFFERS; IN DIGITAL TELEVISION RECEIVERS

FIELD OF THE INVENTION

This invention relates to digital television transmission systems wherein a minimal buffer is used to store pre-roll and post-roll content to enable seamless switching across primary and addressable content channel multiplexes, while enabling the most efficient use of available bandwidth.

DISCUSSION OF PRIOR ART

Digital TV systems carry video and audio content as digital compressed streams over satellite, cable, or IP networks to subscriber homes. Digital TV receivers in subscriber homes uncompress the content and render on TV sets. Addressable content insertion in digital TV systems enables, among other applications, a method to provide advertisements targeted at individual households. For the purpose of this document, "Primary Channel" refers to the currently tuned channel for which addressable content streams are to be inserted.

There are multiple methods to accomplish addressable content insertion on digital TV systems. Two macro directions in which this could be accomplished is by either (i) inserting addressable content on local storage onto Primary Channel, or (ii) switching to an addressable content stream and then switching back to Primary Channel.

To accomplish (i) there is need for local storage space on digital TV receivers to store complete addressable content. This would need to be stored for multiple ad avails and for multiple TV channels. There is a large number of installations of digital TV receivers in subscriber homes that do not have the memory needs to store addressable content in their local storage. This is a big deterrent for implementing this approach for existing subscriber homes.

Switching to an addressable content stream and then switching back to Primary Channel is an option suitable for existing digital TV receiver in subscriber homes, as it does not assume the need for local storage on the receivers. This is the approach taken by SCTE (Society of Cable Telecommunications Engineers), which is an organization that has come up with a standard that provides a form of addressable content delivery on digital TV systems. Per SCTE standards, conditioning the video and audio streams at the head-end enables switching between the Primary Channel and the addressable content stream and vice-versa. This standard is called SCTE DVS-766.

In order to adhere to this standard, multiple advertisement streams are simultaneously delivered to digital TV receivers. The receiver selects one of the addressable content streams based on received addressing information and locally stored selection criteria, and switches at the appropriate time.

The DVS-766 standard defined two stream conditioning systems, Level-0 (L0) which accomplishes non-seamless switching and Level-1 (L1) that accomplishes seamless switching.

Level-0 systems described in FIG. 1, permit addressable content streams designated for insertion onto the Primary Channel, to be transmitted in a transport multiplex different from the one that is carrying the Primary Channel. The Receiver tunes to the RF channel carrying the Addressable Content Channel multiplex that contains the addressable content streams and then selects and decodes the required addressable content stream.

In this system, addressable ads are carried on either the same or distinct multiplexes than the ones carrying the network feed. 11 is the first multiplex carrying the network feed along with a generic ad 13 that is also carried in the same multiplex, which would require no switching between multiplexes. Alternatively, the addressable ad 14 could inhabit its own multiplex 12, which would require a channel switch and potentially introduce a latency.

Level-0 switching is non-seamless because of the need to have filler during the time the tuner takes to switch to a different multiplex, as shown in FIG. 2. There now exist two channels, 20 and 21. During these fillers black frames and silent audio data are transmitted on the multiplex so as to avoid displaying any artifacts or losing any significant audio and video data.

Bandwidth for the addressable content streams in a single transport multiplex used as a shared resource for all addressable content insertions across all needed TV channels in the transmission system, is an optimal way of planning transmission bandwidth. But L0 comes with a non-seamless switching when addressable content is inserted.

In Level-1 systems described in FIG. 3, all the addressable content streams for a particular Primary Channel are present in the same transport multiplex as that of the Primary Channel. The addressable content streams are conditioned to enable receivers to switch to the selected addressable content seamlessly.

Level-1 systems provide a seamless switch mechanism, but are hard to implement from a cable transmission bandwidth planning perspective. Bandwidth needs to be allocated in every multiplex that contains TV channel which needs addressable content insertion support. In cable systems there are multiple 6 MHz transport multiplexes in each of which bandwidth needs to be allocated for the simultaneous addressable content streams. In satellite systems, the cost of RF spectrum is prohibitive to support bandwidth allocation for multiple addressable content streams across different transport multiplexes.

In summary L0 and L1 are different compromises between viewing experience and flexibility in transmission bandwidth, given the assumption that there is no local storage to store addressable content for local insertion, on the receiver.

SUMMARY OF THE INVENTION

In this invention a system is described that provides seamless switching across Primary Channel and the addressable content streams, yet having the addressable content streams sent over a different transport multiplex from that of the Primary Channel. The system assumes that there is temporary local storage to store a small duration of Pre-roll and Post-roll content sets. These content sets are used as buffer content that are decoded and presented to user during the time the tuner takes to tune to a different transport multiplex.

This invention thus provides a method to provide seamless switching across streams on digital television receivers and set-top boxes, with a primary content stream and one or more addressable content streams being sent over different transport multiplexes such as primary transport multiplex and addressable content transport multiplex while optimizing bandwidth allocated in a digital television network and using the storage available on digital television receivers and set-top boxes comprising the steps of:

a. Switching from the primary content stream to an addressable content stream further comprising the steps of:
   i. Switching to a locally stored pre-roll content to be rendered, upon receiving a signal switch point, in the primary content stream;
   ii. Tuning to the addressable content transport multiplex, in parallel to the pre-roll content rendering;
   iii. Switching to the addressable content stream on the currently chosen multiplex at a pre-determined decision point after the completion of tuning; and
b. Switching back from the addressable content stream to the primary content stream, further comprising the steps of:
   i. Switching to a locally stored post-roll content that is rendered;
   ii. Tuning to the primary transport multiplex, in parallel with post-roll content rendering; and
c. Switching to the currently tuned multiplex at a pre-determined decision point after the completion of tuning.

This invention also provides an apparatus to provide seamless switching across streams on digital television receivers and set-top boxes, with a primary content stream and one or more addressable content streams being sent over different transport multiplexes such as primary transport multiplex and addressable content transport multiplex while optimizing bandwidth allocated in a digital television network and using the storage available on digital television receivers and set-top boxes comprising a head end architecture and a receiver architecture characterized by an enhanced ad-server, an enhanced splicer to perform the steps of:
a. Switching from the primary content stream to an addressable content stream further comprising the steps of:
   i. Switching to a locally stored pre-roll content to be rendered, upon receiving a signal switch point, in the primary content stream;
   ii. Tuning to the addressable content transport multiplex, in parallel to the pre-roll content rendering;
   iii. Switching to the addressable content stream on the currently chosen multiplex at a pre-determined decision point after the completion of tuning; and
b. Switching back from the addressable content stream to the primary content stream, further comprising the steps of:
   i. Switching to a locally stored post-roll content that is rendered;
   ii. Tuning to the primary transport multiplex, in parallel with post-roll content rendering; and
c. Switching to the currently tuned multiplex at a pre-determined decision point after the completion of tuning.

In a preferred embodiment there is provided an apparatus to provide seamless switching across streams on digital television receivers and set-top boxes, with a primary content stream and one or more addressable content streams being sent over different transport multiplexes such as primary transport multiplex and addressable content transport multiplex while optimizing bandwidth allocated in a digital television network and using the storage available on digital television receivers and set-top boxes comprising a head end architecture and a receiver architecture where:
a. The head end architecture further comprises:
   i. A vendor-specific content preparation system;
   ii. An enhanced ad server;
   iii. A vendor-specific server;
   iv. An enhanced splicer;
   v. An in-band channel modulator;
   vi. An ad-channel modulator;
   vii. An out of band channel modulator; and viii. A signal combiner;
b. The receiver architecture further comprises:
   i. A tuner;
   ii. One or more transport demultiplexers, that demultiplex the transport stream coming from the tuner and transmits streams to one or more decoders;
   iii. A decision engine which instructs a switch engine and one or more pre-roll and post-roll content server based on selection criteria meta-data;
   iv. A switching engine which controls the tuner and program ID filters (or MD filters) on the transport demultiplexers to enable seamless switching between multiplexes and stored content streams to be passed onto the decoders;
   v. A pre-roll and post-roll content server that accesses one or more data-stores containing this content and streams them to the Transport Demultiplexer as stored content streams;
   vi. A trigger signal decoder used to decode signals that may be on a separate data-stream filtered to it;
   vii. A video decoder;
   viii. An audio decoder; and
   ix. A data-store for pre-roll and post-roll content.

BRIEF DESCRIPTION OF DRAWINGS

FIG. 1 describes the Level-0 systems;
FIG. 2 shows how Level-0 switching is non-seamless because of the need to have filler during the time the tuner takes to switch to a different multiplex;
FIG. 3 shows Level-1;
FIG. 4 shows the stream conditioning system of the present invention termed as Splice'nSwitch;
FIG. 5 depicts an example with Pre-roll and Post-roll Content Sets and two transport multiplexes for the present invention;
FIG. 6 shows an example of head-end architecture that suitable for a Splice'nSwitch system;
FIG. 7 shows an example Receiver supporting Splice'nSwitch capability;
FIGS. 8 and 9, describes one embodiment of the method for implementing the Switching engine.

DETAILED DESCRIPTION OF PREFERRED EMBODIMENTS

Figure 10:
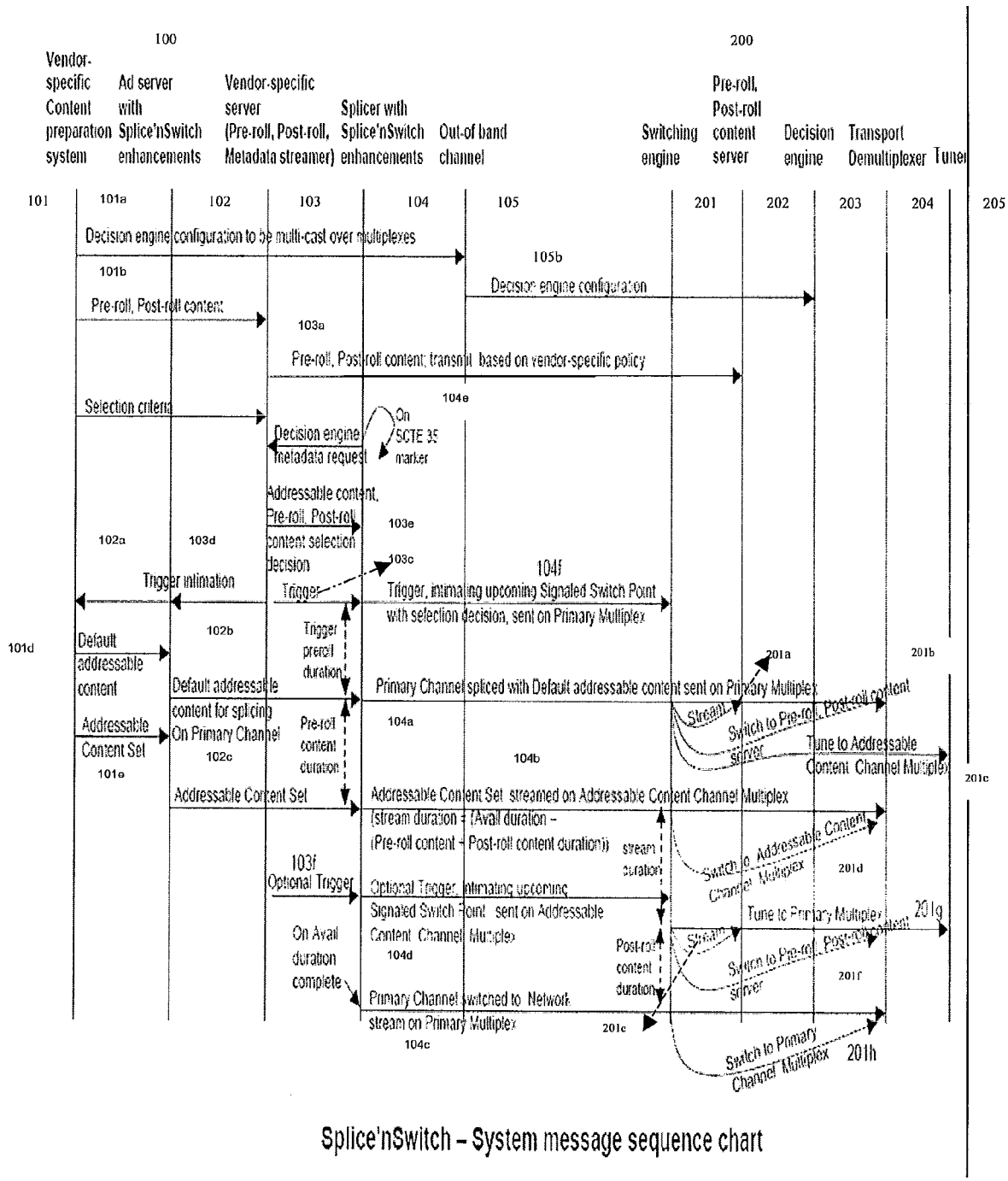
FIG. 10 shows the Splice'nSwitch-system message sequence chart.

In this invention, a system that provides seamless switching across Primary Channel and the addressable content streams, while having the addressable content streams sent over a different transport multiplex from that of the Primary Channel, is described. The system assumes that there is temporary local storage on the receiver to store a small duration of Pre-roll and Post-roll content sets. These content sets are used as buffers and are decoded and presented to viewers during the time the tuner takes to tune to a different transport multiplex.

It is seen that in existing digital TV receivers in subscriber homes there is free RAM (volatile memory) that is available to store the Pre-roll and Post-roll content sets. This invention does not presume the type of local storage on the digital TV receiver, and only assumes that there is an existence of minimal local storage to allow for storing content that is rendered during the tuner switch latency.

Stream Conditioning

The stream conditioning system described in this invention termed as Splice'nSwitch. FIG. 4, describes the concept as sequence of activities in a digital TV receiver. The Primary Channel Multiplex 401 is the channel on which the currently tuned television content is playing. This primary channel also contains advertisements that are part of the television channel 403*a*, 403*b*, and 403*c* referred to as national ads, in this document. These are default advertisements which appear on the Primary Channel Multiplex and are not consumer-oriented or customer-specific. The Addressable Content Channel Multiplex 402 has a number of addressable content streams 404*a*, 404*b*, that are created by individual vendors, based on customer demographics. For purposes of the example discussed in this figure, the primary channel multiplex 401 has a television channel "p" 405 playing, when a local ad-avail 405*a* is scheduled to appear. While this ad avail 405*a* could be the default national advertisement 403*a*, 403*b*, 403*c*, this invention discusses the switching mechanism to an addressable content channel multiplex 402 that serves up addressable content streams. An event, called the Signal Switch Point 406 occurs on the primary channel multiplex, when an ad avail is set to begin. Once this event triggers, the system switches to a pre-roll content 407 buffer, which is typically stored locally on a digital television receiver (also called a set-top box, in some cases). Simultaneous to this transition to the pre-roll content 407 buffer, the tuner 408 tunes into the addressable channel multiplexer 408*a*. On a logical decision point, which is typically after the tuning duration has transpired, the system switches 409 to the addressable content feed 404*b* on the currently tuned channel multiplexer. When the addressable advertisement ends, the system reaches a Signal Switch Point 410 on the addressable content channel multiplex. The system switches to a post-roll content buffer 411, which is also on the television receiver. In parallel to this event, the tuner 408 tunes back 408*b* to the Primary Channel Multiplex. On a logical decision point, which is typically after the tuning duration has transpired, the system switches 413 back to the primary channel 414 on the currently tuned channel multiplexer.

FIG. 5 depicts a more detailed example with Pre-roll and Post-roll Content Sets and two transport multiplexes 501 and 502 which serve the content to be shown to the viewers during an avail 503. The transport multiplexes each showing the presence of a Splice'nSwitch system with a Primary channel containing content on the primary channel 501*a* and the metadata trigger signals 501*b*. A default ad with video and audio streams associated with it 501*d*, 501*e* also exists on the primary channel. In this example, the addressable Content Set is comprised of two addressable content streams 502*a*, 502*b* with respective video 502*d*, 502*f* and audio 502*e*, 502*g* components, and also has metadata trigger signals 502*c*. The metadata trigger signals 501*h*, 502*j* are not mandatory and work in conjunction with the Signal Switch Points 501*c*, 502*i* on each of the Primary Channel and Addressable Content Channel multiplexes, respectively. Besides trigger information, the metadata 501*i*, 502*h* could further contain additional information for the Decision engine. Time boundaries are specified within which the transport packets containing video, audio and data associated with Addressable Content Set may be transmitted in the Addressable Content Channel Multiplex.

It is shown that there are two each of Pre-roll 503*a*, 503*b* and Post-roll 503*c*, 503*d* content that relate to each of the corresponding addressable content on the Addressable Channel Multiplex. Although two different Pre-roll and Post-roll Content Sets are shown here, the invention makes no assumptions on the number of Pre-roll and Post-roll Content Sets and their specific mapping to the streams in the Addressable Content Set.

One of the addressable content designated as default, with corresponding audio and video components 501*d*, 501*e* is present in the Primary Channel. This exists in the same PIDs as the Network's video and audio PIDs 501*f*, 501*g*. This default addressable ad content is updated with the corresponding Pre-roll and Post-roll content on the head-end. This default ad content will be selected by Receivers that do not implement Splice'nSwitch mechanism and by Splice'nSwitch enabled Receivers that do not respond to selection criteria for this Addressable Content Set. The remaining addressable content streams are present in the Addressable Content Channel Multiplex 502*d*, 502*e*, 502*f*, 502*g*.

An opportunity to switch from the Primary Channel video and audio streams is shown as a Signaled Switch Point 501*c*. Another Signaled Switch Point 502*i* on the Addressable Content Channel Multiplex marks the opportunity to switch back to the Primary Channel stream. Pre-roll and Post-roll content buffers 503*a*, 503*b*, 503*c*, 503*d* exist on the local storage from which the decoder starts rendering just after the corresponding Signaled Switch Point 501*c*, 502*i*. During this time the Receiver tunes to new multiplex and acquires the new channel to decode. Once the local stored content rendering is complete, it switches to decoding content from the new channel, to which the Receiver has tuned to.

The duration of the Pre-roll and Post-roll content is greater than the time required for the slowest Receiver to tune to and begin decoding the new multiplex.

Pre-roll and Post-roll content needed for this method is expected to be available locally on the digital TV receiver. This invention does not make any assumptions relating to following aspects of the Pre-roll and Post-roll content, a) Bitrate or any other decoding properties
b) Origin of the content (could be one of and not limited to being locally generated or sent over the transmission).
c) Time when the content has reached local storage, if sent from an external source
d) Length of the content and the rendering duration, with the only constraint that the content render time is greater than or equal to the maximum time the tuner takes to switch from one multiplexer to another.
e) Rules or decisions that determine the specific content to render during a switch activity, given there could be multiple content for each of Pre-roll and Post-roll Pre-roll and Post-roll content could be as simple as a single static slide to being the first and last parts of the corresponding addressable content sent on the addressable content stream.

Although this invention does not assume anything related to the source of the Pre-roll and Post-roll content, for completeness of understanding few possible mechanisms are discussed.

In one possible method, the Pre-roll and Post-roll content could be sent by the head-end on all the multiplexes on a periodic basis, to be stored on the Receiver. Each of the Receiver shall identify if the Pre-roll and Post-roll content is addressed to the addressable group to which the Receiver belongs, and then stores the corresponding Pre-roll and Post-roll content. This method is suitable for sending static slide or Pre-roll, Post-roll content that are distinct from that of the addressable content stream.

In another possible method, assuming Pre-roll and Post-roll content are first and last parts respectively of the addressable content stream, then this content could be sent on the multiplex prior to the arrival of the Signaled Switch Point, such that the content needed for rendering just after the Signaled Switch Point is available for the decoder. This invention does not mandate any content constraints on the Pre-roll and Post-roll.

Timing

The transmission of addressable content stream on the Addressable Content Channel Multiplex is typically aligned in time to:

(Signaled Switch Paint on the Primary Channel Multiplex+ Corresponding Pre-Roll Content Duration).

For ease of implementation it is recommended that all Pre-roll content in a Pre-roll Content Set are of the same duration although this invention does not preclude varying Pre-roll content durations. The transmission of the Primary Channel on the Primary Channel Multiplex is aligned in time with the end of avail duration. The default addressable ad content that is sent as part of the Primary Channel is aligned in time with the Signaled Switch Point on the Primary Channel Multiplex, and is expected to last the complete avail duration.

Signaled Switch Point on the Addressable Channel Multiplex is aligned in time to,
(End of Avail Duration–Corresponding Post-Roll Content Duration).

For ease of implementation it is recommended that all Post-roll content in a Post-roll Content Set are of the same duration although this invention does not preclude varying Post-roll content durations.

In scenarios with varying Pre-roll and Post-roll content for each of the addressable content streams, each of the addressable content streams duration and their transmission times would be different. The preparation of the addressable content streams that fall within the avail boundaries is expected to done by the head-end.

Trigger Signals 501*h*, 502*j* are associated with each Signaled Switch Point to indicate the location of the Switched Point in time. The Trigger Signal data could be any of data method inside the multiplex, including and not limited to data in the video and audio streams. In the Addressable Content Channel Multiplex, it is possible to have multiple Trigger Signals to signal different Signaled Switch Points for different addressable content streams. One possible Trigger Signal could be a transport packet using a unique PID containing system clock value on when to switch. There could also be two separate Trigger Signals, one each for video and audio streams.

Signaled Switch Points shall occur only when both the video and audio data needed for rendering, prior to switching, has been received. Signaled Switch Point and the associated Trigger Signal could be Receiver generated events and do not mandate the need for a data element on the transport stream. The Signaled Switch Point could be an event based on a pre-fetched avail schedule available on the Receiver. In such cases of Receiver generated Signaled Switch Point, it is possible that there is no corresponding Trigger Signal.

The primary essence of this invention is the mechanism to make a seamless switch when switching across multiplexes, by using a Pre-roll and Post-roll pre-stored content to fill the time the tuner takes to tune to the needed multiplexer. Those skilled in this art shall be able to extend this concept and would appreciate that all of those extensions that come under the purview of this invention.

Splice'nSwitch System

FIG. 6, shows an example of the system architecture of the present invention. A vendor-specific content-preparation system 601 accepts addressable content 601*a* and selection criteria 601*b* and handles the conditioning of the addressable content streams. It also handles the preparation and conditioning of Pre-roll and Post-roll content corresponding to different addressable content streams. Some parts of the conditioning could also be handled by the Splicer 604. The vendor-specific content preparation system processes the incoming addressable content 601*a* and selection criteria 601*b* to create addressable content streams 601*c* and pre-roll and post-roll content 601*d*. This is fed separately to the ad server 602 and the vendor-specific server 603.

The Splice'nSwitch enhanced Ad server 602 sends the needed addressable content streams to the Splicer 604. The Ad server streams the needed addressable content streams at the chosen time to the Splicer to insert into the Multiplex for transmission to the Receivers.

The Vendor specific Pre-roll, Post-roll content and metadata server 603 handles the transmission of metadata including but not limited to data needed for switching and Pre-roll, Post-roll content decision making on the Receiver. This server also shall send the needed Pre-roll and Post-roll content to the Receivers. The policy for content insertion, and the exact mechanics and type of content sent for Pre-roll, Post-roll insertions on the Receiver is vendor-specific and is outside the scope of this invention.

The Splicer 604 handles the insertion of Addressable Content Sets 602*a*, 602*b*, 602*c* and Trigger Signals 602*d* onto the selected multiplex. The primary channel content along with trigger data 604*a* is sent to an in-band channel modulator 605. The addressable content along with trigger data 604*b* is sent to an ad channel modulator 606. These are used in conjunction with the output on an out of band (OOB) channel modulator 607 and communicated to the receiver 608. The Vendor specific content preparation system communicates the decision engine configurations to the Decision engine on the Receiver through the OOB channel.

It is expected that all of the Primary Channel stream, Addressable Content Set and the Pre-roll, Post-roll Content Set are conditioned so as to insure that there are no video and audio artifacts produced on the Receiver, when a switch happens between them. As an illustration, for MPEG-2 content insertion SMPTE-312M standard specifies the list of criteria for conditioning the streams so as ease seamless switching on the Receiver.

Trigger Signals 604*a* need to be inserted onto the Primary Channel Multiplex and the Addressable Content Channel Multiplex 604*b* for defining the Switched Signal Points. This is taking into account the Pre-roll and Post-roll content duration for each of the addressable content streams.

It is possible under the scope of this invention that the Addressable Content Multiplex is used to send other network streams in addition to the Addressable Content Set. This is a possibility in Satellite TV scenarios where multiplex bandwidth is large and spectrum limitations would not afford allocating exclusive multiplex for the Addressable Content Set.

The Splice'nSwitch enhanced Ad server 602, Vendor specific Pre-roll, Post-roll content and metadata server 603 and Vendor-specific content preparation system 601 could reside outside the physical head-end premises and connected over a network to the head-end infrastructure. This invention in no way dictates the physical availability of these components in a head-end.

Splice'nSwitch Receiver

FIG. 7 shows a detailed example of a Receiver of the present invention, which supports Splice'nSwitch requirements. The Transport demultiplexer 701 demultiplexes the transport stream coming from the tuner and passes the video to the video decoder 702 and audio to the audio decoder 703.

It is assumed for this example that the Trigger Signal is on a separate data stream and that is filtered to a Trigger Signal decoder 704. The Trigger Signal is expected to be available early enough so as to provide sufficient time for the switching engine to take its decision and do the switching. The Switching engine 705 gets the needed switch instruction from the Decision engine 706. Switching engine controls the tuner 707 and the PID filters on the Transport demultiplexer to make seamless switch between multiplexes and stored content streams to be passed onto the decoders. The video and audio decoders are unaware of the switch. As network streams and the Pre-roll, Post-roll content are conditioned, by controlling the Tuner and the Pre-roll, Post-roll content server, the Switching engine can make a seamless switch.

The Decision engine 706 in addition to instructing the switch engine, also instructs the Pre-roll and Post-roll content server on the specific Pre-roll, Post-roll content to be served on each of the avails, based on the selection criteria metadata 708 received from the head-end. The selection criteria and the operation of the Decision engine are outside the scope of this invention. It is assumed for this example that the Pre-roll and Post-roll content are available on a separate data stream that is stored onto a Pre-roll, Post-roll content store 709 on the Receiver. The Pre-roll, Post-roll content server 710 accesses this store, on instructions from the Decision engine and streams them onto the transport multiplex, as timed by the Switching engine.

FIGS. 8 and 9, describes one embodiment of the method for implementing the Switching engine. This should not be construed as the only way to implement the Switching engine.

On Trigger Signal 801 on the Primary Channel, the Switching engine coordinates with the Decision engine to identify the Pre-roll, Post-roll content and the addressable content stream 802 to which the switching needs to happen.

On the Signaled Switch Point 803, two activities are done simultaneously.
 (i) The Transport demultiplexer PID filters are set to access streams from Pre-roll, Post-roll content server 804. And then the Pre-roll, Post-roll content server is instructed to stream the identified pre-roll content to be rendered by the decoders 805.
 (ii) The tuner is instructed to tune to the Addressable Content Channel Multiplex. 806

Once both (i) and (ii) activities are complete 807, then the Switching engine sets the Transport demultiplexer PID filters to access streams on the selected addressable content stream 808.

On the Addressable Content Channel Multiplex, once the Signaled Switch Point 901 is reached, two activities are done simultaneously,
 (i) The Transport demultiplexer PID filters are set to access streams from Pre-roll, Post-roll content server 902. And then the Pre-roll, Post-roll content server is instructed to stream the identified post-roll content to be rendered by the decoders 903.
 (ii) The Tuner is instructed to tune to the Primary Channel Multiplex 904.

Once both (i) and (ii) are complete 905, then the Switching engine sets the Transport demultiplexer PID filters to access the Primary Channel 906.

This would complete one Splice'nSwitch activity for a given avail. It is assumed that the Switching engine handles latency needs for setting the Transport demultiplexer PID filters and for addressable content decision making, by controlling the rate of content streaming from the local Pre-roll, Post-roll content server. It is expected that there are no artifacts in audio and video are introduced during the switch process.

FIG. 10 shows the overall system and messages between various components of the one embodiment of the system. The components of the Receiver 200 including Switching engine 201, Pre-roll, post-roll content server 202, Decision engine 203, Transport multiplexer 204 and the Tuner 205 are shown on the right hand side. The components outside the Receiver 100 including the Vendor-specific content preparation system 101, the Ad server with splice'nswitch enhancements 102, the Vendor-specific Pre-roll, Post-roll content and metadata server 103, the Splicer with splice'nswitch enhancements 104 and the OOB 105 are shown on the left hand side. The messages across components are explained below:

Decision engine configurations 101*a* are sent by the Vendor specific content preparation system 101 to the OOB channel 105. This is expected to be multicast over all the multiplexes so as to be received by as many of the Receivers. The specific policy and frequency of sending the Decision engine configuration is implementation dependent and is outside the scope of this invention. The OOB channel is used to send the configuration information to the Decision engine on the Receiver 105*b*.

Pre-roll and post-roll content that needs to be sent to the Receiver are prepared by the Vendor-specific content preparation system 101*b*. Based on the implementation policy the Vendor specific server (Pre-roll, Post-roll, metadata streamer) 103*a* implementing the policy shall send the specific Pre-roll, Post-roll content to the Pre-roll, Post-roll content server on the Receivers. The specific timeframe and frequency for sending Pre-roll, Post-roll content is implementation dependent and is outside the scope of this invention.

On receiving the SCTE 35 marker 104*e* on the Primary Channel, the Splicer 104 requests the Vendor-specific server for the specific switching and Pre-roll, Post-roll selection metadata to be sent to the Switching engine on the Receivers. The response to this is sent by the Vendor-specific server 103*e*.

Trigger is generated by the Vendor-specific server in response to the SCTE 35 marker on the Primary Channel. The Trigger message is sent to the Splicer 103*c* and an intimation of this signal is sent both to the Ad server 103*d* and the Vendor-specific content preparation system 102*a*. On receiving the Trigger signal from the Vendor-specific server, the Splicer sends the Trigger 104*f* with the pre-roll time to the Switching engine on the Receiver over the Primary Multiplex, along with the selection decision. The Trigger intimates the upcoming Signaled Switch Point after the pre-roll time for the Receiver to switch at that time instant.

On reception of Trigger intimation, the Vendor-specific content preparation system prepares both the Default addressable content 101*d* and the Addressable Content Set 101*e* and sends it to the Ad server. At the end of pre-roll duration after the trigger, at the time that coincides with the Signaled Switch Point on the Primary Multiplex on the Receiver, the Ad server streams the Default addressable content 102*b* to the Splicer. The Splicer splices this content onto the Primary Channel in lieu of the Network content and sends that as the Primary Channel on the Primary Multiplex 104*a*.

On reception of the Trigger, the Switching engine on the Receiver prepares for the arrival of the Signaled Switch Point after the pre-roll duration by communicating the decision for switch with the Decision engine. At the Signaled Switch Point instant, the Switching engine instructs the following, (i) Pre-roll, Post-roll content to stream the corresponding Pre-roll content 201a, (ii) Transport Multiplexer to switch to the Pre-roll, Post-roll content server stream instead of the Network streams (in the case of the default Primary Channel not meeting the addressability needs on that Receiver) 201b and (iii) Tuner to tune to the Addressable Content Channel Multiplex 201c.

At the end of time elapsed which is Signaled Switch Point+ the Pre-roll content duration for the corresponding addressable content stream, the Ad server sends the addressable content streams to the Splicer 101e to be sent to the Receiver 104b. For the sake of this embodiment, it is shown that all of the Addressable Content Set has Pre-roll and Post-roll content of the same duration and hence it is shown that the Ad server and subsequently the Splicer sends the complete Addressable Content Set to the Receiver at the same time instant. The invention does not preclude conditions where there are different Pre-roll, Post-roll content durations for each of the addressable content streams and thus the Ad server would stream each of the addressable content streams at different points of time to synchronize with the completion of the Pre-roll content duration on the corresponding Receivers consuming specific addressable content streams.

At the end of the Pre-roll content rendering duration on the Receiver, the Switching engine instructs the Transport Demultiplexer to switch to the Addressable Content Channel Multiplex 201d (if the addressability on the Receiver is not the Default Primary Channel content). When this switch happens, the decoder on the Receiver shall start rendering the corresponding addressable content stream that has been streamed from the headend.

The stream duration of the addressable content stream that is determined by the Avail duration (Pre-roll content duration+Post-roll content duration), for each of the addressable content streams. The Ad server determines and controls the stream duration of the content sent by the Splicer.

There is a Signaled Switch Point to switch back from the Addressable Content Channel Multiplex to a Post-roll content. There could be an optional Trigger sent from the headend, where the Vendor-specific server shall send the Trigger information 103f to the Splicer to be sent over the Addressable Content Channel Multiplex to the Receivers 104d.

At the completion of the stream duration, the Switching engine on the Receiver instructs the following, (i) Pre-roll, Post-roll content server to stream the corresponding Post-roll content 201e, (ii) Transport Demultiplexer to switch from the Addressable Content Channel Multiplex to the Pre-roll, Post-roll content stream 201f, and (iii) Tuner to tune to Primary Multiplex 201g.

On completion of the Avail duration, at the headend, the Splicer switches the Primary Channel on the Primary Multiplex back to the Network stream 104c.

The completion of the Avail duration, the Receiver completes the rendering of the Post-roll content and that time instant, the Switching engine on the Receiver instructs the Transport Demultiplexer to switch to the Primary Channel Multiplex 201h.

This sequence completes one Splice'nSwitch activity interaction between the headend and the corresponding Receivers.

The invention claimed is:

1. A method to provide seamless switching across streams on digital television receivers and set-top boxes, with a primary content stream and one or more addressable content streams being sent over different transport multiplexes such as primary transport multiplex and addressable content transport multiplex while optimizing bandwidth allocated in a digital television network and using the storage available on digital television receivers and set-top boxes comprising the steps of:
   a. Switching from the primary content stream to an addressable content stream further comprising the steps of:
      i. Switching to a locally stored pre-roll content to be rendered, upon receiving a signal switch point, in the primary content stream;
      ii. Tuning to the addressable content transport multiplex, in parallel to the pre-roll content rendering;
      iii. Switching to the addressable content stream on the currently chosen multiplex at a pre-determined decision point after the completion of tuning; and
   b. Switching back from the addressable content stream to the primary content stream, further comprising the steps of:
      i. Switching to a locally stored post-roll content that is rendered;
      ii. Tuning to the primary transport multiplex, in parallel with post-roll content rendering; and
   c. Switching to the currently tuned multiplex at a pre-determined decision point after the completion of tuning.

2. The method of claim 1 wherein one of the addressable content streams is designated as a default stream, for compatibility across receivers, with one or more corresponding components on the primary stream such that:
   a. The default stream has first and second unique identifiers, which correspond to the primary content stream's video and audio identifiers; and
   b. The default stream is updated with the corresponding pre-roll and post-roll content on a transmission system's head-end.

3. The method of claim 1 wherein the pre-roll and post-roll content are of a duration greater than the time required for the receiver that is slowest to tune to and begin decoding.

4. The method of claim 1 wherein the pre-roll and post-roll content is available on the digital television receiver where:
   a. There is no restriction on the content's bit-rate and decoding properties;
   b. There is no restriction on the origin of the content such that the content could be generated locally or sent from an external source;
   c. There is no restriction on the time when the content reaches local storage; and
   d. There is no restriction on the length of the content and the rendering duration.

5. The method of claim 1 where the pre-roll and post-roll content can be a single static image, with variable rendering time, determined dynamically.

6. The method of claim 1 where the pre-roll and post-roll content can be the first and last portions of the addressable content sent over the addressable content stream.

7. The method of claim 1 where the pre-roll and post-roll content is sent by the head-end on all the multiplexes on a periodic basis, to be stored on the receiver.

8. The method of claim 1 wherein the primary and addressable content channel transport multiplex comprises (a) content and (b) signal-switch points where:
   a. Switching from the primary transport multiplex to the addressable content transport multiplex, can select between one or more pre-roll content buffers containing audio, video and related metadata; and
   b. Switching back from the addressable content transport multiplex to the primary transport multiplex can select between one or more post-roll content buffers containing audio, video and related metadata.

9. The method of claim 1 wherein the signal-switch point is an event to signal switching out from the currently rendered stream.

10. The method of claim 1 wherein the primary and addressable content transport multiplex comprises (a) content, (b) one or more signal-switch points and (c) one or more meta-data trigger signals wherein the meta-data trigger signals contain timing information and additional information for enabling switching decisions.

11. The method of claim 10 wherein the one or more meta-data trigger signals contain timing information about deadlines within which transport packets containing video, audio and data associated with the stream (both primary and addressable) are specified.

12. The method of claim 10 wherein the one or more meta-data trigger signals are associated with signal-switch points to indicate the location of the signal-switch point in time.

13. The method of claim 10 wherein the one or more meta-data trigger signals data could be any data in the multiplex including data in the video and audio streams.

14. The method of claim 10 wherein each of the meta-data trigger signals on the addressable content channel multiplex can be associated with more than one signal switch point.

15. The method of claim 10 wherein the one or more meta-data trigger signals could be a transport packet using a unique identifier containing a system clock value on when to switch.

16. The method of claim 10 wherein the one or more meta-data trigger signals could be independent signals for audio and video.

17. The method of claim 1 wherein the transmission of addressable content stream on the addressable content transport multiplex is aligned in time to being after the signal switch point on the primary channel multiplex and the corresponding pre-roll content duration.

18. The method of claim 1 wherein the signal switch point on the addressable content transport multiplex is aligned in time to the end of the default stream on the primary transport multiplex minus the corresponding post-roll content duration.

19. The method of claim 1 where the pre-roll and post-roll content is available prior to the signal-switch points making the content needed for rendering after the signal-switch point available to respective video and audio decoders.

20. The method of claim 1 where the signal switch point and the associated trigger signal could be receiver generated events and not require a data-element on the digital television network.

21. An apparatus to provide seamless switching across streams on digital television receivers and set-top boxes, with a primary content stream and one or more addressable content streams being sent over different transport multiplexes such as primary transport multiplex and addressable content transport multiplex while optimizing bandwidth allocated in a digital television network and using the storage available on digital television receivers and set-top boxes comprising a head end architecture and a receiver architecture characterized by an enhanced ad-server, an enhanced splicer, a vendor-specific content preparation system, a vendor-specific server, a decision engine, a pre-roll and post-roll content server, a trigger signal decoder and a data-store for pre-roll and post-roll content to perform the steps of:
  a. Switching from the primary content stream to an addressable content stream further comprising the steps of:
    i. Switching to a locally stored pre-roll content to be rendered, upon receiving a signal switch point, in the primary content stream;
    ii. Tuning to the addressable content transport multiplex, in parallel to the pre-roll content rendering;
    iii. Switching to the addressable content stream on the currently chosen multiplex at a pre-determined decision point after the completion of tuning; and
  b. Switching back from the addressable content stream to the primary content stream, further comprising the steps of:
    i. Switching to a locally stored post-roll content that is rendered;
    ii. Tuning to the primary transport multiplex, in parallel with post-roll content rendering; and
  c. Switching to the currently tuned multiplex at a pre-determined decision point after the completion of tuning.

* * * * *